United States Patent [19]
Komarov

[11] 3,951,558
[45] Apr. 20, 1976

[54] APPARATUS FOR DEMOUNTABLY COUPLING TWO MEMBERS

[76] Inventor: Anatoli N. Komarov, 100 Erskine Place, Coop City, Bronx, N.Y. 10475

[22] Filed: Nov. 22, 1974

[21] Appl. No.: 526,105

[52] U.S. Cl. ............................ 403/231; 52/753 F; 312/263
[51] Int. Cl.² .......................................... F16B 12/14
[58] Field of Search............. 52/753 F, 753 E, 756, 52/755, 758 F; 403/296, 231, 406, 388; 312/263, 204

[56] References Cited
UNITED STATES PATENTS

| | | | |
|---|---|---|---|
| 321,054 | 6/1885 | Ritter | 292/251 |
| 343,807 | 6/1886 | Field | 52/753 F X |
| 2,133,204 | 10/1938 | Max | 52/757 X |
| 2,624,386 | 1/1953 | Russell | 403/406 X |
| 3,288,510 | 11/1966 | Gough et al. | 292/251 |

FOREIGN PATENTS OR APPLICATIONS

| | | | |
|---|---|---|---|
| 1,792 | 1879 | United Kingdom | 403/388 |

*Primary Examiner*—Andrew V. Kundrat
*Attorney, Agent, or Firm*—Bauer & Amer

[57] ABSTRACT

A fastening device for two members that is particularly suited for use in the so-called "knock-down" furniture comprises a metallic insert formed with a bore and threaded into one of the members so as to be flush therewith. The other member is formed with an aperture that is in registration with the bore when the two members are in mutual contact. A screw is received through the aperture to threadably engage the bore. Tightening on the screw detachably fastens the members as the insert acts as a seat for the other member and acts to distribute the load thereon over its larger peripheral area.

1 Claim, 1 Drawing Figure

U.S. Patent    April 20, 1976    3,951,558
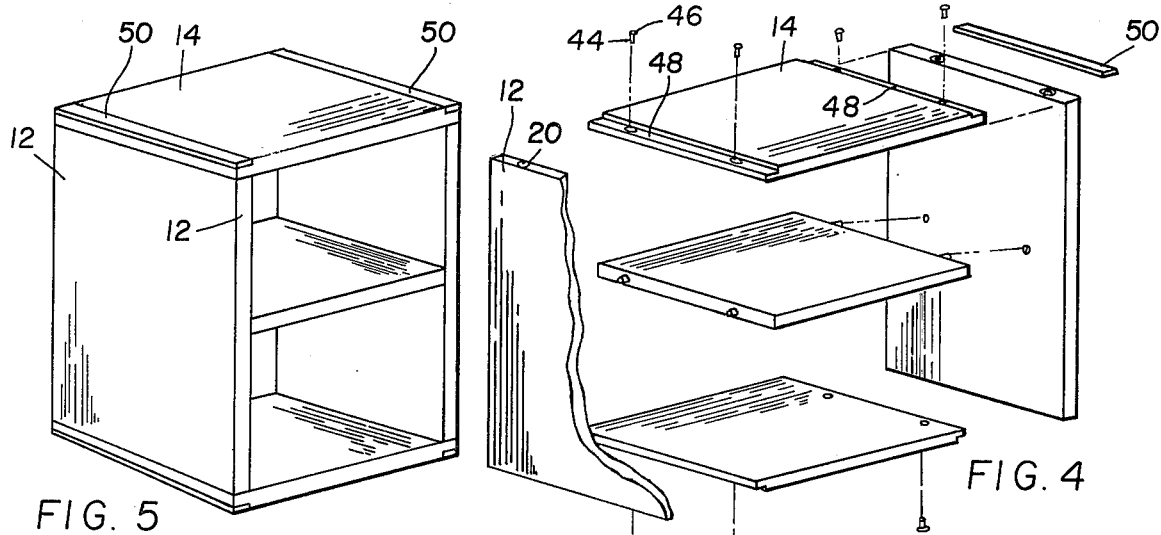
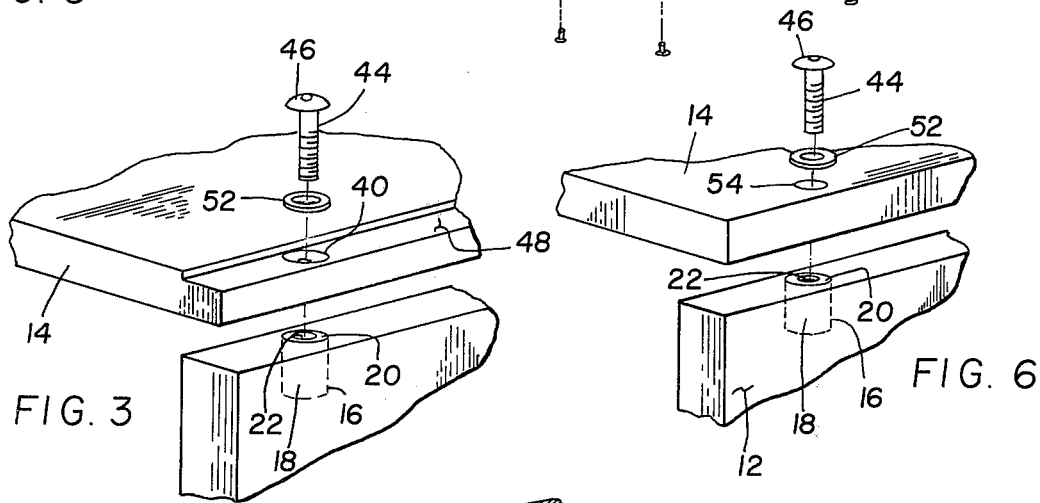
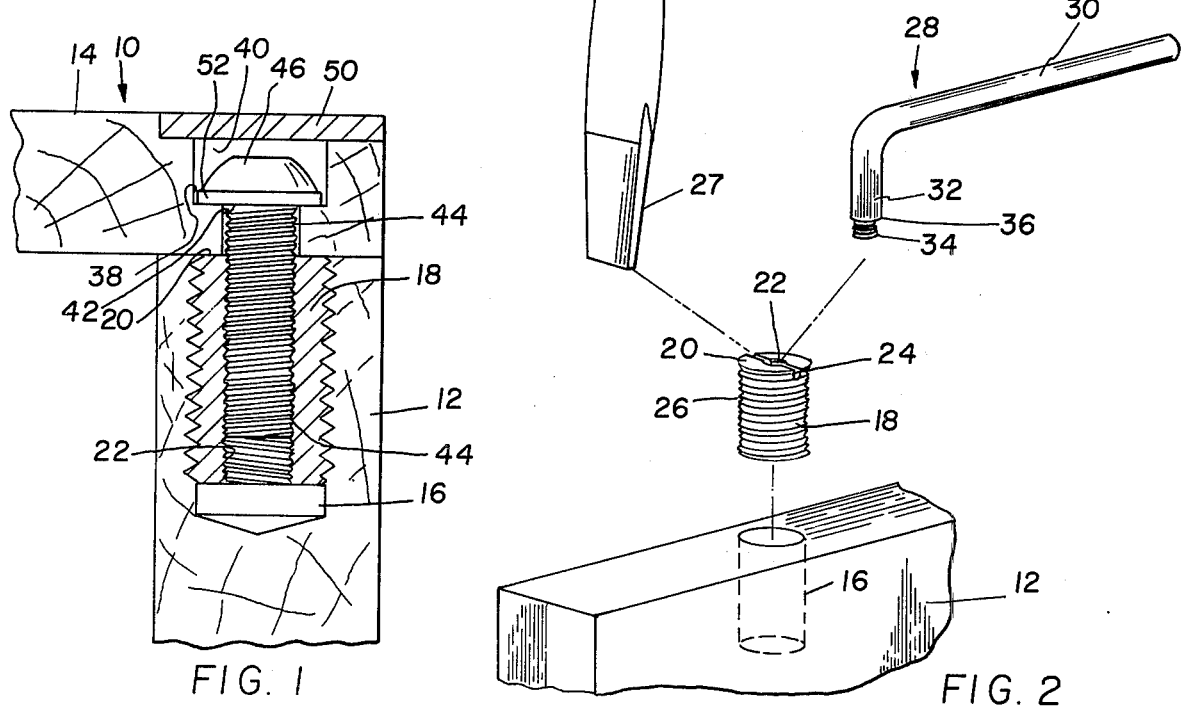

APPARATUS FOR DEMOUNTABLY COUPLING TWO MEMBERS

This invention relates to a means for fastening elements and more particularly it relates to apparatus for use in knock-down furniture.

It is common practice to ship furniture fully assembled. When so shipped, it is apparent that the volume of the shipping container is large when compared to the weight of the article of furniture. Since shipping costs, in part, are a function of volume, it is advantageous to reduce this volume. Further, with ever increasing material costs, it would be equally advantageous to reduce package size and effect savings in the material needed to fabricate the shipping container or package. Then again, reducing package size increases handling ease and reduces the probability of damage.

Of course, these advantages have been long recognized so for these and other reasons several prior apparatuses have been devised to utilize the many inherent benefits stemming from furniture easily knocked or broken down. For example, there has been disclosed knock-down furniture wherein the cross members are formed with or contain one or a plurality of hanger bolts that are received in complementary apertures in the furniture end pieces. In other devices the hanger bolts have been replaced with threaded or unthreaded dowels and this construction technique is commonly found in beds and sofas. Yet, members that project from the ends of the cross piece are notorious for the rapidity in which they wear. Hence, it is not uncommon to find the threads on wooden dowels completely or partially stripped after several sequences of assembly and disassembly. So, too, the threads on metallic studs are vulnerable to damage when the pieces lie disassembled with the studs exposed.

Damage is only one aspect of the problem. These dowels or metallic studs are usually of reduced cross section and so are subject to high levels of flexural and sheer stress. Thus, they are equally notorious for the ease in which they break, particularly if the dowel is wood, or cause the supporting cross member to fracture along its supporting region, particularly if the stud hardened steel, or both.

Further, in other prior constructions use is made of interengaging mortises and tenons, or cleats threadably attached to planar regions. These constructions leave something to be desired in regard to their mechanical strength. Moreover, they are not readily adaptable to modern furniture because they are difficult to conceal.

The present invention is designed to overcome the undesirable features inherent in prior knock-down constructions.

Generally, in the present invention one member of the pair to be joined receives a peripherally threaded and hardened insert with a lateral end of the insert driven flush with, so as to comprise a portion of, the member's surface. A threaded bore is centrally disposed along the longitudinal axis of the insert and communicates with the exposed lateral end. The other member of the furniture is formed with an aperture so that when the members are in mutual contact, the aperture is in registration with and coincident on the insert central bore.

The aperture is countersunk so that when a screw concomitantly engages the aperture and threads into the bore, the members will be drawn together while the screw head is flush with the exposed peripheral surface or located slightly thereunder. The aforesaid exposed lateral end of the insert provides a strengthened face onto which the jointing member seats. Indeed, the increased peripheral diameter of the insert acts to distribute the forces acting on same over a larger area when compared to the peripheral area of a stud or dowel alone and this increased area over which the forces must act reduces the stresses thereon.

It is, therefore, an object of the present invention to provide an apparatus particularly adaptable for use in knock-down furniture that is devoid of studs or elements projecting from the members to be joined when in the knocked down configuration.

It is another object of the present invention to provide an appliance for detachably joining various members or furniture pieces and able to do so with a minimum number of stress bearing elements.

It is a further object of the present invention to shift the areas of high stress concentration in knock-down furniture to hardened inserts that are better able to withstand the load.

It is yet another object of the present invention to provide a coupling device adapted for use with knock-down furniture that remains concealed from view when in use, or can be easily made to do so, and that needs but one tool for its operation.

Other objects and features of the present invention will become apparent from the following detailed description considered in connection with the accompanying drawings. It is to be understood, however, that the drawings are designed for purposes of illustration only and not as a definition of the limits of the invention for which reference should be made to the appending claims.

In the drawings wherein the same reference numeral represents the same element throughout the several views:

FIG. 1 is a side view of the present invention showing how same is used to demountably join two furniture pieces;

FIG. 2 is a partial exploded view in perspective of one of the furniture pieces of FIG. 1 and showing the means used to drive and secure the inventive insert in the furniture piece;

FIG. 3 is an exploded perspective view of the device seen in FIG. 1 with the covering strip removed for purposes of clarity;

FIG. 4 is an exploded perspective view of a furniture piece with part broken away and showing use of a plurality of the devices shown in FIG. 1;

FIG. 5 is a perspective view of the device of FIG. 4 and showing same assembled; and FIG. 6 is another embodiment of the present invention.

Turning now to the drawings and particularly FIGS. 1–3, there is shown one embodiment of the present invention. The knock-down furniture or portion thereof is generally indicated by reference numeral 10. The furniture comprises one member or element 12 and another member or piece 14. Member 12 is formed with a cavity 16 substantially of cylindrical shape. As seen more clearly in FIG. 2, cylinder 16 has one of its two lateral ends defined in and residing on one of the surfaces or faces of member 12.

A hardened insert or plug 18 preferably of cylindrical shape, is defined by two opposed lateral end faces, one of them being indicated by reference numeral 20. A threaded bore 22 is formed through insert 18 and is preferably disposed along the central longitudinal axis thereof. A slot or channel 24 is formed in face 20 and as seen in the last mentioned figure, the slot intercepts bore 22. It will be understood, however, that slot 24 does not necessarily have to include bore 22 as other configurations of the slot in face 20 are contemplated.

Disposed on the periphery of cylindrical insert or plug 18 are means to affix the plug in cavity 16. Typically the means to affix the plug in the cavity will be a thread means and when this is the case, a plurality of threads 26 will be formed on the periphery of the plug. To insert plug 18 in cavity 16, a blade 27 is placed in slot 24 after which the leading threads of the plug are superposed over cavity 16. A torque is then applied to blade 27 which is, obviously, coupled to insert 18. The sizing of cavity 16 in combination with threads 26 mandates that as the torque is applied, the insert will self-tap into the cavity. The insert is so driven into cavity 16 until face 20 is flush with the surface of member 12 as shown in FIGS. 1 and 3. In addition to driving plug 18 with blade 27, it is also possible to drive and tap the insert in cavity 16 by means of a tool generally indicated by reference numeral 28. Tool 28 comprises a handle 30 formed with or attached to an extension 32. Extension 32 is preferably orthogonal to the longitudinal axis of handle 30 and on the free end thereof carries a threaded portion 34 operable to screw in threaded bore 22. Threaded portion 34 is of reduced diameter when compared to extension 32 and thereby defines a shoulder 36 at the discontinuity of cross section. The tool operates by threading portion 34 in bore 22 and then turning handle 30 about insert 18 which action eventually causes shoulder 36 to interfere with and abut against a portion of face 20. Since the threads of portion 34, bore 22 and those on the periphery of plug 18 all run in the same sense or direction, continued turning of handle 30 causes the peripheral threads on plug 18 to "catch" on the surface of cavity 16. When the insert is driven flush as above noted, backing off on tool 28, that is, a reverse turning of handle 30, lifts shoulder 36 from face 20 and allows portion 34 to thread out of bore 22.

Other means may be used to affix insert 18 in cavity 16. For example, instead of using thread means 26, it is possible to epoxy the insert in the cavity. Further, various frictional means such as rigdes, hooks or minute spikes can be placed on the periphery of cylinder 18 and used to fasten same in the cavity.

The other furniture member 14 is formed with an aperture having a discontinuity of cross section thereby defining a shoulder or seat 38 at the interface of a first aperture portion 40 and a second aperture portion 42. A threaded stud or machine screw 44 carrying a head 46 is threadably received in bore 22 as described below. The size of head 46 is selected so as to cover shoulder 38 when engaged therewith. Preferably that portion of member 14 carrying one or a plurality of the apertures will be defined by a ledge 48. Ledge 48 will have a reduced thickness when compared to the remaining portion of member 14 as shown in FIG. 3. After members 12 and 14 are joined, as described herein, a batten or decorative covering strip 50 can be attached on the outboard surface of ledge or channel 48. The covering strip will have a thickness and be of a material composition to cause it to conform to the outboard surface of its respective furniture member. Various means such as pressure sensitive adhesives or cooperating VELCRO patches can be used to detachably mount decorative strip 50 to ledge 48. Of course, it is readily apparent that when the members are joined, as will now be described, each aperture will be in registration with a corresponding insert bore 22.

To operate the device and detachably mount the furniture member, reference is made to FIGS. 4 and 5 while referring back to FIGS. 1–3. Members 12 and 14 or a plurality of them are placed in mutual contact which aligns a respective aperture in member 14 over a corresponding bore 22. Threaded stud or machine screw 44 is received through an associated aperture and is tightened therein until the underside of cap 46 abuts against shoulder 38. A washer 52 may be interposed between cap 46 and shoulder 38 to reduce wear and distribute the stress on the shoulder. Screws 44 are tightened drawing the corresponding surfaces of members 12 and 14 into mutual contact. Screws 44 are further tightened until the members are firmly mated as seen in FIG. 1 with those regions defining aperture portion 42 and immediately opposed to face 20 being compressed against the last mentioned face. Since the threads on the periphery of insert 18 act over a larger area than the threads defining bore 22, the stress experienced by the threads on the periphery of insert 18 as well as those corresponding and associated threads cut in member 12, is reduced when compared to the stress reacting and tending to pull on the threads in bore 22. Thus, the self-tapped threads in member 12 experience a reduced stress intensity by use of insert 18. The threads in bore 22, being formed of a harder material than member 12, are better able to withstand the load caused by tensioning bolt 44 as well as abrasive effect of same caused by its frequent insertion and removal as the furniture is respectively assembled and knocked down.

After the screws are tightened and the members joined, covering strip 50 or other decorative material may be demountably attached to the outboard surface of ledge 48 to conceal aperture portions 40. The assembled furniture article appears as is shown in FIG. 5 with strips 50 covering ledges 48 and made to conform with the adjacent furniture surface.

Turning to FIG. 6, there is shown a somewhat modified form of the present invention. An aperture 54 is defined through member or piece 14. Washer 52 is sufficiently large so as to cover the aperture as well as the adjacent surface portions of member 14. Tightening screw 44 causes cap 46 to drive washer 52 against member 14 and thereby firmly join same to member 12. Operation of this embodiment remains essentially as that shown and described for the embodiment in FIGS. 1–5 and so need not be discussed here, it clearly applying.

Insert or plug 18 may be comprised of any hard material. For example, the insert might be formed of metals such as aluminum, steel, iron or the like. Indeed, it is contemplated to use some of the hard synthetics such as nylon, teflon or any of the hard plastics.

While only a few embodiments of the present invention have been shown and described, it is to be understood that many changes and modifications can be made hereto without departing from the spirit and scope thereof.

What is claimed is:

1. Knock-down Furniture formed by engaging at least two pieces and adapted to be easily assembled and broken down for packing and reassembly comprising:

a plurality of cylindrical cavities formed in one of the furniture pieces with each of said cavities having one end thereof communicating with the engaging surface of said one furniture piece;

a plurality of cylindrical hardened inserts each having a threaded exterior and defined by two opposed lateral end faces, each of said inserts being formed with a threaded bore along the central longitudinal axis thereof that communicates with one of said opposed lateral end faces, an associated one of each of said inserts being threadably received in a respective one of said cavities so that each one of said inserts remains affixed therein with said one of said insert lateral faces of each of said plurality of inserts being flush with said engaging surface;

a plurality of apertures through the other one of the furniture pieces, each of said apertures being coincident with a corresponding one of said plurality of insert bores when the furniture pieces are placed in mutual contact;

a plurality of machine screws each having a head of sufficient size to cover a corresponding one of said apertures so that when said screws are received through a corresponding one of said apertures to threadably engage an associated one of said bores, the regions of said other furniture piece adjacent to and defining each of said apertures will be driven into contact with a corresponding one of said opposed lateral end faces defining each of said inserts to thereby provide a hardened seat onto which said region of said another furniture piece abuts, each of said apertures being formed with a discontinuity of cross section defined by a first portion to receive said bolt head and a second portion to receive the stem of said bolt so that when the knocked-down furniture pieces are assembled and joined by concomitant engagement by each of said screws, each of said heads thereof reside below the outboard surface of said other furniture piece, said other furniture piece is formed with a ledge of reduced cross section, said ledge of said other furniture piece having a thickness less than the remaining portion of said other furniture piece, and a decorative covering strip means equal to the width of said ledge and having an exposed surface free of visible securing means thereon and proportioned to fit in the last mentioned ledge thereby to cover and conceal said apertures with said covering means adapted to conform contiguously to the outboard surface of said other furniture piece and being removable from said last mentioned ledge without the removal of added securing means to uncover and afford access to said machine screws.

* * * * *